United States Patent
Gao et al.

(10) Patent No.: US 10,772,096 B2
(45) Date of Patent: Sep. 8, 2020

(54) UPLINK CONTROL INFORMATION TRANSMISSION METHOD, UPLINK CONTROL INFORMATION RECEPTION METHOD, TERMINAL AND BASE STATION

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/480,812

(22) PCT Filed: Feb. 7, 2018

(86) PCT No.: PCT/CN2018/075614
§ 371 (c)(1),
(2) Date: Jul. 25, 2019

(87) PCT Pub. No.: WO2018/137714
PCT Pub. Date: Aug. 2, 2018

(65) Prior Publication Data
US 2019/0394773 A1 Dec. 26, 2019

(30) Foreign Application Priority Data

Jan. 25, 2017 (CN) .......................... 2017 1 0056536

(51) Int. Cl.
*H04W 72/04* (2009.01)
*H04L 5/00* (2006.01)
(52) U.S. Cl.
CPC ....... *H04W 72/0446* (2013.01); *H04L 5/0044* (2013.01); *H04W 72/0413* (2013.01)

(58) Field of Classification Search
CPC .......... H04W 72/0446; H04W 72/0413; H04L 5/0044
See application file for complete search history.

(56) References Cited

U.S. PATENT DOCUMENTS

2014/0328304 A1  11/2014  Suzuki et al.
2015/0139101 A1   5/2015  Guo et al.
(Continued)

FOREIGN PATENT DOCUMENTS

| CN | 102377537 A | 3/2012 |
|---|---|---|
| CN | 103580818 A | 2/2014 |

(Continued)

OTHER PUBLICATIONS

Written Opinion and International Search Report of the International Searching Authority dated Apr. 27, 2018 for International Application No. PCT/CN2018/075614.
(Continued)

*Primary Examiner* — Christine Ng (57) ABSTRACT

A UCI transmission method, a UCI reception method, a terminal and a base station are provided. The UCI transmission method includes, when a collision is present between different types of UCIs with a first TTI length and/or a collision is present between a UCI with the first TTI length and a UCI with a second TTI length, transmitting the UCIs with the collision to a base station simultaneously using a second sPUCCH format on a predetermined sPUCCH resource corresponding to the second sPUCCH format, or determining a transmission scheme for the UCIs with the collision in accordance with a sPUCCH format adopted by the UCI with the first TTI length.

18 Claims, 3 Drawing Sheets when a collision is present between different types of UCIs with a first TTI length and/or a collision is present between a UCI with the first TTI length and a UCI with a second TTI length, transmitting the UCIs with the collision to a base station simultaneously using a second sPUCCH format on a predetermined sPUCCH resource corresponding to the second sPUCCH format, or determining a transmission scheme for the UCIs with the collision in accordance with a sPUCCH format adopted by the UCI with the first TTI length ⎬ 31

(56) References Cited

U.S. PATENT DOCUMENTS

| | | |
|---|---|---|
| 2015/0264708 A1 | 9/2015 | Li et al. |
| 2017/0013618 A1 | 1/2017 | Shin |
| 2018/0014323 A1 | 1/2018 | Huang et al. |
| 2018/0110042 A1* | 4/2018 | Chen ...................... H04L 5/0055 |
| 2018/0176909 A1* | 6/2018 | Wikstrom ......... H04W 72/0446 |
| 2018/0242347 A1* | 8/2018 | Sahlin ............... H04W 72/1268 |
| 2018/0375619 A1* | 12/2018 | Hwang .................... H04B 7/26 |
| 2019/0116611 A1* | 4/2019 | Lee ................... H04W 72/1278 |
| 2019/0132837 A1* | 5/2019 | Yi ............................ H04L 5/00 |

FOREIGN PATENT DOCUMENTS

| | | |
|---|---|---|
| CN | 103796327 A | 5/2014 |
| CN | 103947246 A | 7/2014 |
| CN | 104640118 A | 5/2015 |
| CN | 104661316 A | 5/2015 |

OTHER PUBLICATIONS

Chinese Office Action dated Dec. 28, 2018 for CN Application No. 201710056536.9.

* cited by examiner

Fig.1

Fig.2 when a collision is present between different types of UCIs with a first TTI length and/or a collision is present between a UCI with the first TTI length and a UCI with a second TTI length, transmitting the UCIs with the collision to a base station simultaneously using a second sPUCCH format on a predetermined sPUCCH resource corresponding to the second sPUCCH format, or determining a transmission scheme for the UCIs with the collision in accordance with a sPUCCH format adopted by the UCI with the first TTI length ⟩ 31

UPLINK CONTROL INFORMATION TRANSMISSION METHOD, UPLINK CONTROL INFORMATION RECEPTION METHOD, TERMINAL AND BASE STATION

CROSS-REFERENCE TO RELATED APPLICATIONS

The present application is the U.S. national phase of PCT Application No. PCT/CN2018/075614 filed on Feb. 7, 2018, which claims a priority of the Chinese patent application No. 201710056536.9 filed on Jan. 25, 2017, which is incorporated herein by reference in its entirety.

TECHNICAL FIELD

The present disclosure relates to the field of communication technology, in particular to an Uplink Control Information (UCI) transmission method, a UCI reception method, a terminal, and a base station.

BACKGROUND

Figure 1:
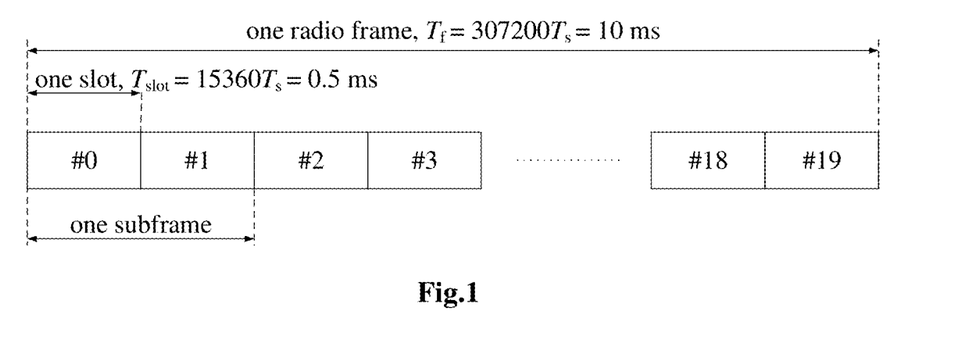
FIG. 1 is a schematic view showing a FS1.

In related art, frame structure type 1 (FS1) is adopted by a Long Term Evolution (LTE) Frequency Division Duplexing (FDD) system. In the FDD system, different carrier frequencies are adopted for uplink and downlink transmission, but a same frame structure is adopted for the uplink and downlink transmission. As shown in FIG. 1, on each carrier, a radio frame having a length of 10 ms includes 10 subframes each having a length of 1 ms. Each subframe includes two slots each having a length of 0.5 ms, and a length of a Transmission Time Interval (TTI) for the transmission of uplink and downlink data is 1 ms.

Figure 2:
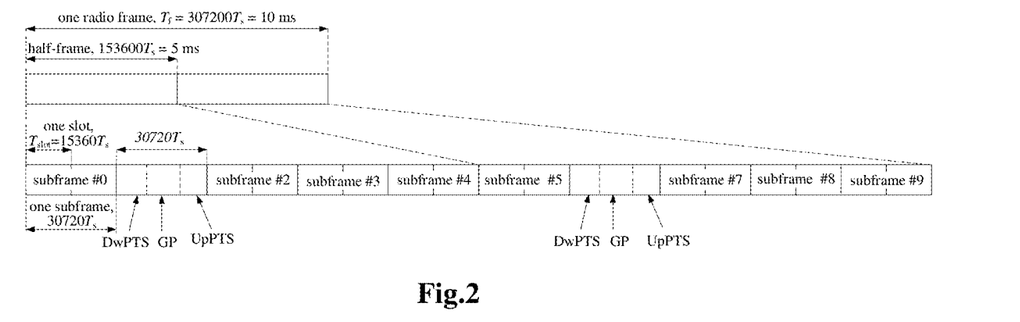
FIG. 2 is a schematic view showing a conventional FS2.

In the related art, a frame structure type 2 (FS2) is adopted by a LTE Time Division Duplexing (TDD) system. In the LTE TDD system, different subframes and slots are adopted for the uplink and downlink transmission at a same frequency. As shown in FIG. 2, in the FS2, each radio frame having a length of 10 ms includes two half-frames each having a length of 5 ms. Each half-frame includes 5 subframes each having a length of 1 ms. There are three types of subframes in the FS2, i.e., downlink subframes, uplink subframes and special subframes. Each special subframe includes a Downlink Pilot Time Slot (DwPTS), a Guard Period (GP) and an Uplink Pilot Time Slot (UpPTS). Each half-frame includes at least one downlink subframe, at least one uplink subframe, and at most one special subframe.

In the related art, the UCI at least includes Acknowledgement (ACK)/Non-Acknowledgement (NACK), Periodic Channel State Information (P-CSI), and a Scheduling Request (SR). The ACK/NACK corresponds to feedback information for downlink transmission (a Physical Downlink Shared Channel (PDSCH) or a Physical Downlink Control Channel (PDCCH)/enhanced PDCCH indicating the release of downlink Semi-Persistent Scheduling (SPS) resources). The P-CSI is adopted to feed back a downlink channel state, so as to enable a base station to schedule the downlink transmission. The SR is adopted to request uplink scheduling, i.e., request the base station to schedule a terminal to transmit a Physical Uplink Shared Channel (PUSCH). These different types of UCIs may be transmitted separately. When a collision occurs for these types of UCIs, a certain type of UCI may be transmitted and another certain type of UCI may be dropped in accordance with a predetermined rule, or several types of UCIs may be transmitted simultaneously. In the related art, the UCI is transmitted on a Physical Uplink Control Channel (PUCCH) having a length of 1 ms. A feedback opportunity of the SR and P-CSI is determined in accordance with a preconfigured period and a preconfigured subframe offset. A feedback period and a subframe offset value are both configured on the basis of subframes, so a minimum feedback opportunity is to perform the feedback within each subframe.

Along with the development of the requirements on the mobile communication services, several organizations, including International Telecommunication Union (ITU), have defined a higher user plane time delay requirement on a future mobile communication system. One of the principal methods for reducing the time delay is to reduce a length of the TTI, so shortened TTI (sTTI) transmission needs to be supported.

For the sTTI transmission, as a typical operating mode, the subframe structure defined in a conventional LTE mechanism includes a plurality of sTTIs each having a length smaller than 1 ms. For the downlink transmission, a shortened PDSCH (sPDSCH) and a shortened PDCCH (sPDCCH) are supported, and for the uplink transmission, a shortened PUSCH (sPUSCH) and a shortened PUCCH (sPUCCH) are supported. The sPUCCH may at least carry the feedback information for the ACK/NACK transmitted in downlink within the sTTI (s-ACK/NACK for short). The terminal which supports the sTTI transmission may have the following features.

The terminal may support dynamic handover between the sPDSCH and the PDSCH. A feedback position of the s-ACK/NACK is determined at least in accordance with the length of the sTTI, and a feedback position of the ACK/NACK transmitted in downlink data transmission within a normal TTI having a length of 1 ms (ACK/NACK for short) is determined at least in accordance with the length of the normal TTI, so the collision may probably occur for the s-ACK/NACK and the ACK/NACK at a same moment (i.e., they need to be fed back at the same moment).

It may be configured to adopt a shorter feedback period for feeding back the P-CSI (s-P-CSI for short) and the SR (s-SR for short), so as to reduce a scheduling time delay. The s-SR is at least adopted to request the scheduling of the sPUSCH. In addition, the terminal which supports the sTTI transmission may also be configured to support the SR to request the scheduling of the PUSCH with the normal TTI length.

The sTTI transmission may be supported separately in the uplink transmission and the downlink transmission. In other words, the time delay is strictly required for the downlink transmission while the time delay is not required for the uplink transmission, the sTTI transmission may be merely adopted in the downlink transmission, and vice versa.

In the above cases, various combination collisions may probably occur between different types of shortened UCIs (sUCIs), and various combination collisions may probably occur between the sUCI and the UCI. However, there is currently no definite method for transmitting the sUCI and the UCI in the case of the collisions, so the reliability of the network communication may be adversely affected.

SUMMARY

An object of the present disclosure is to provide a UCI transmission method, a UCI reception method, a terminal and a base station, so as to solve a problem in the related art where in the case that various combination collisions occur between different types of sUCIs, and various combination collisions occur between the sUCI and the UCI, there is no method for transmitting the sUCI and the UCI, so the reliability of the network communication is adversely affected.

In order to solve the above technical problem, in one aspect, the present disclosure provides in some embodiments a UCI transmission method, including, when a collision is present between different types of UCIs with a first TTI length and/or a collision is present between a UCI with the first TTI length and a UCI with a second TTI length, transmitting the UCIs with the collision to a base station simultaneously using a second sPUCCH format on a predetermined sPUCCH resource corresponding to the second sPUCCH format, or determining a transmission scheme for the UCIs with the collision in accordance with a sPUCCH format adopted by the UCI with the first TTI length.

In a possible embodiment of the present disclosure, the determining the transmission scheme for the UCIs with the collision in accordance with the sPUCCH format adopted by the UCI with the first TTI length includes: when a first sPUCCH format is adopted by the UCI with the first TTI length, transmitting the UCIs with the collision to the base station simultaneously using the second sPUCCH format on the predetermined sPUCCH resource corresponding to the second sPUCCH format; or when the second sPUCCH format is adopted by the UCI with the first TTI length, transmitting the UCIs with the collision to the base station simultaneously using the second sPUCCH format on the sPUCCH resource corresponding to the second sPUCCH format, wherein the sPUCCH resource corresponds to the UCI with the first TTI length.

In a possible embodiment of the present disclosure, the first sPUCCH format is a sPUCCH format with a maximum payload capacity smaller than a predetermined bit value, and the second sPUCCH format is a sPUCCH format with a maximum payload capacity greater than or equal to the predetermined bit value.

In a possible embodiment of the present disclosure, the UCI includes at least one of ACK/NACK, P-CSI and a SR.

In a possible embodiment of the present disclosure, the transmitting the UCIs with the collision to the base station simultaneously using the second sPUCCH format includes concatenating the UCIs with the collision in accordance with a first predetermined rule, and transmitting the concatenated UCIs with the collision to the base station simultaneously using the second sPUCCH format.

In a possible embodiment of the present disclosure, the first predetermined rule includes ordering the UCIs in accordance with TTI lengths of the UCIs, and ordering the UCIs with a same TTI length in accordance with types of the UCIs.

In a possible embodiment of the present disclosure, the first predetermined rule includes ordering the UCIs in accordance with the types of the UCIs, and ordering the UCIs of a same type in accordance with TTI lengths.

In a possible embodiment of the present disclosure, the transmitting the UCIs with the collision to the base station simultaneously using the second sPUCCH format includes, when a total quantity of bits of the UCIs with the collision is greater than a transmission capacity of the second sPUCCH format on the sPUCCH resource, compressing the total quantity of bits of the UCIs with the collision in accordance with a second predetermined rule, and transmitting the compressed total quantity of bits of the UCIs with the collision to the base station in the second sPUCCH format. The second predetermined rule includes dropping a part of the UCIs and/or combining a part of the UCIs with the collision.

In a possible embodiment of the present disclosure, prior to transmitting the UCIs with the collision to the base station simultaneously using the second sPUCCH format, the UCI transmission method further includes: judging whether a terminal supports a simultaneous transmission of the UCIs with the collision in accordance with a configuration of high-layer signaling or a pre-agreed rule; and when the terminal supports the simultaneous transmission of the UCIs with the collision, transmitting the UCIs with the collision to the base station simultaneously using the second sPUCCH format.

In a possible embodiment of the present disclosure, the UCI transmission method further includes, when judging that the terminal does not support the simultaneous transmission of the UCIs with the collision, dropping the UCI of a predetermined type in the UCIs with the collision in accordance with a third predetermined rule.

In a possible embodiment of the present disclosure, the first TTI length is smaller than the second TTI length.

In another aspect, the present disclosure provides in some embodiments a terminal, including a transmission module configured to, when a collision is present between different types of UCIs with a first TTI length and/or a collision is present between a UCI with the first TTI length and a UCI with a second TTI length, transmit the UCIs with the collision to a base station simultaneously using a second sPUCCH format on a predetermined sPUCCH resource corresponding to the second sPUCCH format, or determine a transmission scheme for the UCIs with the collision in accordance with a sPUCCH format adopted by the UCI with the first TTI length.

In a possible embodiment of the present disclosure, the transmission module is further configured to: when a first sPUCCH format is adopted by the UCI with the first TTI length, transmit the UCIs with the collision to the base station simultaneously using the second sPUCCH format on the predetermined sPUCCH resource corresponding to the second sPUCCH format; or when the second sPUCCH format is adopted by the UCI with the first TTI length, transmit the UCIs with the collision to the base station simultaneously using the second sPUCCH format on the sPUCCH resource corresponding to the second sPUCCH format, wherein the sPUCCH resource corresponds to the UCI with the first TTI length.

In a possible embodiment of the present disclosure, the first sPUCCH format is a sPUCCH format with a maximum payload capacity smaller than a predetermined bit value, and the second sPUCCH format is a sPUCCH format with a maximum payload capacity greater than or equal to the predetermined bit value.

In a possible embodiment of the present disclosure, the UCI includes at least one of ACK/NACK, P-CSI and a SR.

In a possible embodiment of the present disclosure, the transmission module configured to transmit the UCIs with the collision to the base station simultaneously using the second sPUCCH format is further configured to: concatenate the UCIs with the collision in accordance with a first predetermined rule, and transmit the concatenated UCIs with the collision to the base station simultaneously using the second sPUCCH format.

In a possible embodiment of the present disclosure, the first predetermined rule includes ordering the UCIs in accordance with TTI lengths of the UCIs, and ordering the UCIs with a same TTI length in accordance with types of the UCIs.

In a possible embodiment of the present disclosure, the first predetermined rule includes ordering the UCIs in accordance with the types of the UCIs, and ordering the UCIs of a same type in accordance with TTI lengths.

In a possible embodiment of the present disclosure, the transmission module configured to transmit the UCIs with the collision to a base station simultaneously using a second sPUCCH format is further configured to: when a total quantity of bits of the UCIs with the collision is greater than a transmission capacity of the second sPUCCH format on the sPUCCH resource, compress the total quantity of bits of the UCIs with the collision in accordance with a second predetermined rule, and transmit the compressed total quantity of bits of the UCIs with the collision to the base station in the second sPUCCH format. The second predetermined rule includes dropping a part of the UCIs and/or combining a part of the UCIs with the collision.

In a possible embodiment of the present disclosure, the terminal further includes a first judgment module configured to judge whether a terminal supports a simultaneous transmission of the UCIs with the collision in accordance with a configuration of high-layer signaling or a pre-agreed rule. The transmission module is further configured to, when the terminal supports the simultaneous transmission of the UCIs with the collision, transmit the UCIs with the collision to the base station simultaneously using the second sPUCCH format.

In a possible embodiment of the present disclosure, the terminal further includes a processing module configured to, when judging that the terminal does not support the simultaneous transmission of the UCIs with the collision, drop the UCI of a predetermined type in the UCIs with the collision in accordance with a third predetermined rule.

In a possible embodiment of the present disclosure, the first TTI length is smaller than the second TTI length.

In yet another aspect, the present disclosure provides a UCI reception method, including, when a collision is present between different types of UCIs with a first TTI length and/or a collision is present between a UCI with the first TTI length and a UCI with a second TTI length, receiving in a second sPUCCH format the UCIs with the collision transmitted simultaneously on a predetermined sPUCCH resource corresponding to the second sPUCCH format and the UCIs with the collision being transmitted simultaneously, or determining a reception scheme for the UCIs with the collision in accordance with a sPUCCH format adopted by the UCI with the first TTI length.

In a possible embodiment of the present disclosure, the determining the reception scheme for the UCIs with the collision in accordance with the sPUCCH format adopted by the UCI with the first TTI length includes: when a first sPUCCH format is adopted by the UCI with the first TTI length, receiving in the second sPUCCH format the UCIs with the collision transmitted simultaneously on the predetermined sPUCCH resource corresponding to the second sPUCCH format; or when the second sPUCCH format is adopted by the UCI with the first TTI length, receiving in the second sPUCCH format corresponding to the UCI with the first TTI length the UCIs with the collision transmitted simultaneously on the sPUCCH resource corresponding to the second sPUCCH format.

In a possible embodiment of the present disclosure, the first sPUCCH format is a sPUCCH format with a maximum payload capacity smaller than a predetermined bit value, and the second sPUCCH format is a sPUCCH format with a maximum payload capacity greater than or equal to the predetermined bit value.

In a possible embodiment of the present disclosure, the UCI includes at least one of ACK/NACK, P-CSI and a SR.

In a possible embodiment of the present disclosure, the receiving in the second sPUCCH format the UCIs with the collision transmitted simultaneously includes determining that the UCIs with the collision are concatenated to each other in accordance with a first predetermined rule.

In a possible embodiment of the present disclosure, the first predetermined rule includes ordering the UCIs in accordance with TTI lengths of the UCIs, and ordering the UCIs with a same TTI length in accordance with types of the UCIs.

In a possible embodiment of the present disclosure, the first predetermined rule includes ordering the UCIs in accordance with the types of the UCIs, and ordering the UCIs of a same type in accordance with TTI lengths.

In a possible embodiment of the present disclosure, the receiving in the second sPUCCH format the UCIs with the collision transmitted simultaneously includes: determining that the UCIs with the collision transmitted simultaneously are acquired after being compressed in accordance with a second predetermined rule. The second predetermined rule includes dropping a part of the UCIs and/or combining a part of the UCIs with the collision.

In a possible embodiment of the present disclosure, prior to receiving in the second sPUCCH format the UCIs with the collision transmitted simultaneously, the UCI reception method further includes: judging whether a terminal supports a simultaneous transmission of the UCIs with the collision in accordance with a configuration of high-layer signaling or a pre-agreed rule; and when judging that the terminal supports a simultaneous transmission of the UCIs with the collision, receiving in the second sPUCCH format the UCIs with the collision transmitted simultaneously.

In a possible embodiment of the present disclosure, the UCI reception method further includes, when judging that the terminal does not support the simultaneous transmission of the UCIs with the collision, determining that the UCI of a predetermined type in the UCIs with the collision are to be dropped by the terminal in accordance with a third predetermined rule.

In a possible embodiment of the present disclosure, the first TTI length is smaller than the second TTI length.

In still yet another aspect, the present disclosure provides in some embodiments a base station, including a reception module configured to, when a collision is present between different types of UCIs with a first TTI length and/or a collision is present between a UCI with the first TTI length and a UCI with a second TTI length, receive in a second sPUCCH format the UCIs with the collision transmitted simultaneously on a predetermined sPUCCH resource corresponding to the second sPUCCH format; or determine a reception scheme for the UCIs with the collision in accordance with a sPUCCH format adopted by the UCI with the first TTI length.

In a possible embodiment of the present disclosure, the reception module is further configured to: when a first sPUCCH format is adopted by the UCI with the first TTI length, receive in the second sPUCCH format the UCIs with the collision transmitted simultaneously on the predetermined sPUCCH resource corresponding to the second sPUCCH format; or when the second sPUCCH format is adopted by the UCI with the first TTI length, receive in the second sPUCCH format corresponding to the UCI with the first TTI length the UCIs with the collision transmitted simultaneously on the sPUCCH resource corresponding to the second sPUCCH format.

In a possible embodiment of the present disclosure, the first sPUCCH format is a sPUCCH format with a maximum payload capacity smaller than a predetermined bit value, and the second sPUCCH format is a sPUCCH format with a maximum payload capacity greater than or equal to the predetermined bit value.

In a possible embodiment of the present disclosure, the UCI includes at least one of ACK/NACK, P-CSI and a SR.

In a possible embodiment of the present disclosure, the reception module configured to receive in the second sPUCCH format the UCIs with the collision transmitted simultaneously by the terminal in the second sPUCCH format is further configured to: determine that the UCIs with the collision transmitted simultaneously are concatenated to each other in accordance with a first predetermined rule.

In a possible embodiment of the present disclosure, the first predetermined rule includes ordering the UCIs in accordance with TTI lengths of the UCIs, and ordering the UCIs with a same TTI length in accordance with types of the UCIs.

In a possible embodiment of the present disclosure, the first predetermined rule includes ordering the UCIs in accordance with the types of the UCIs, and ordering the UCIs of a same type in accordance with TTI lengths.

In a possible embodiment of the present disclosure, the reception module configured to receive in the second sPUCCH format the UCIs with the collision transmitted simultaneously by the terminal in the second sPUCCH format is further configured to: determine that the UCIs with the collision transmitted simultaneously are acquired after being compressed in accordance with a second predetermined rule. The second predetermined rule includes dropping a part of the UCIs and/or combining a part of the UCIs with the collision.

In a possible embodiment of the present disclosure, the base station further includes a second determination module configured to judge whether a terminal supports a simultaneous transmission of the UCIs with the collision in accordance with a configuration of high-layer signaling or a pre-agreed rule. The reception module is further configured to, when judging that the terminal supports a simultaneous transmission of the UCIs with the collision, receive in the second sPUCCH format the UCIs with the collision transmitted simultaneously.

In a possible embodiment of the present disclosure, the base station further includes a determination module configured to, when judging that the terminal does not support the simultaneous transmission of the UCIs with the collision, determine that the UCI of a predetermined type in the UCIs with the collision are to be dropped by the terminal in accordance with a third predetermined rule.

In a possible embodiment of the present disclosure, the first TTI length is smaller than the second TTI length.

In still yet another aspect, the present disclosure provides in some embodiments a terminal, including a processor, a memory and a transceiver. The processor is configured to read a program stored in the memory to, when a collision is present between different types of UCIs with a first TTI length and/or a collision is present between a UCI with the first TTI length and a UCI with a second TTI length, transmit through the transceiver the UCIs with the collision to a base station simultaneously using a second sPUCCH format on a predetermined sPUCCH resource corresponding to the second sPUCCH format, or determine a transmission scheme for the UCIs with the collision in accordance with a sPUCCH format adopted by the UCI with the first TTI length. The transceiver is configured to receive and transmit data. The memory is configured to store therein data for the operation of the processor.

In still yet another aspect, the present disclosure provides in some embodiments a base station, including a processor, a memory and a transceiver. The processor is configured to read a program stored in the memory to, when a collision is present between different types of UCIs with a first TTI length and/or a collision is present between a UCI with the first TTI length and a UCI with a second TTI length, receive through the transceiver in a second sPUCCH format the UCIs with the collision transmitted simultaneously on a predetermined sPUCCH resource corresponding to the second sPUCCH format, or determine a reception scheme for the UCIs with the collision in accordance with a sPUCCH format adopted by the UCI with the first TTI length. The transceiver is configured to receive and transmit data. The memory is configured to store therein data for the operation of the processor.

The technical effects of the present disclosure are as follows. When the collision is present between different types of UCIs with the first TTI length and/or the collision is present between the UCI with the first TTI length and the UCI with the second TTI length, the terminal may transmit the UCIs with the collision simultaneously on an appropriate resource and in an appropriate sPUCCH format. As a result, it is able to transmit the UCIs with the collision to the base station as much as possible while ensuring a transmission time delay for the UCI with the first TTI, thereby to enable the base station acquire the UCI in time, and improve the reliability of the network communication.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the related art, there is currently no scheme for transmitting the sUCI and the UCI in the case of various combination collision between different types of sUCIs and various combination collision between the sUCI and the UCI, so it is impossible ensure the reliability of the network communication. An object of the present disclosure is to provide a UCI transmission method, a UCI reception method, a terminal and a base station, so as to solve the above problem.

Figure 3:
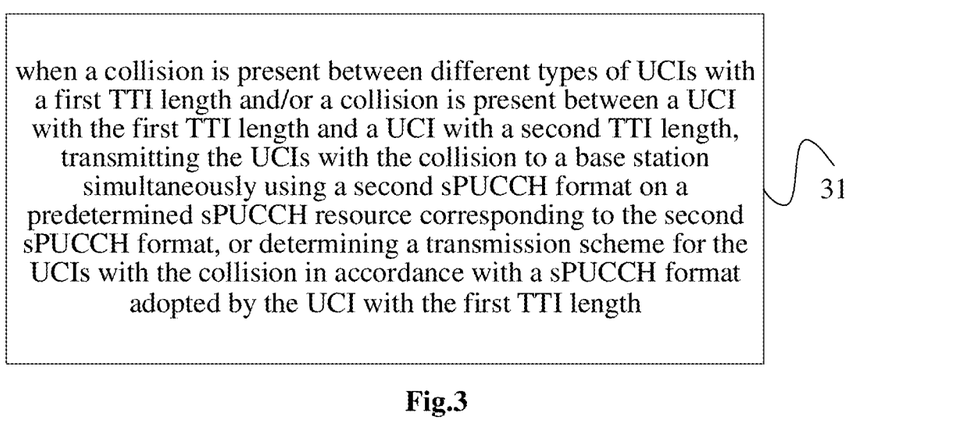
FIG. 3 is a flow chart of a UCI transmission method according to some embodiments of the present disclosure.

The present disclosure provides in some embodiments a UCI transmission method which, as shown in FIG. 3, includes Step 31 of, when a collision is present between different types of UCIs with a first TTI length and/or a collision is present between a UCI with the first TTI length and a UCI with a second TTI length, transmitting the UCIs with the collision to a base station simultaneously using a second sPUCCH format on a predetermined sPUCCH resource corresponding to the second sPUCCH format, or determining a transmission scheme for the UCIs with the collision in accordance with a sPUCCH format adopted by the UCI with the first TTI length.

It should be appreciated that, the first TTI length may be smaller than the second TTI length. For example, the second TTI length may be 1 ms, and the first TTI length may include M symbols, where M is a positive integer smaller than 14; or the second TTI length may be 1 ms, and the first TTI length may be smaller than 1 ms; or the second TTI length may be smaller than 1 ms, and the first TTI length may be smaller than the second TTI length; or the second TTI length may include M1 symbols, and the first TTI length may include M2 symbols, where M1 and M2 are each a positive integer smaller than 14, and M2 is smaller than M1.

In the embodiments of the present disclosure, the first TTI length may refer to a length of a sTTI mentioned in the background. The UCI with the first TTI length may be a dedicated UCI with the first TTI length, and it may include at least one of ACK/NACK, P-CSI and a SR. The second TTI length may refer to a length of a conventional TTI which usually is a subframe having a length of 1 ms. A plurality of pieces of UCI may probably be transmitted by a terminal within a current TTI, and there may probably exist three types of UCIs, i.e., ACK/NACK, P-CSI and SR, corresponding to the first TTI length and the second TTI length, so the collision between the different types of UCIs with the first TTI length may refer to the collision between the different types of UCIs within the first TTI length. For example, a current TTI moment may be a transmission moment where the ACK/NACK and the P-CSI are transmitted, or a transmission moment where the P-CSI and the SR are transmitted. The collision between the UC corresponding to the first TTI and the UCI with the second TTI may refer to the collision between the UCI within the first TTI and the UCI within the second TTI. For example, the current TTI moment may be a transmission moment where the ACK/NACK is transmitted within the first TTI and the SR is transmitted within the second TTI, or the current TTI moment may be a transmission moment where the P-CSI is transmitted within the first TTI and the ACK/NACK is transmitted within the second TTI.

Step 31 may be performed in two modes. In a first mode, the UCIs with the collision may be transmitted on the predetermined sPUCCH resource corresponding to the second sPUCCH format as long as there is the collision between UCIs. It should be appreciated that, the predetermined sPUCCH resource corresponding to the second sPUCCH may refer to a resource pre-agreed between the base station and the terminal, or a resource configured by the base station for the terminal in advance. In a second mode, the appropriate transmission scheme for the UCIs with the collision may be determined in accordance with the sPUCCH format adopted by the UCI with the first TTI length.

To be specific, the determining the transmission scheme for the UCIs with the collision in accordance with the sPUCCH format adopted by the UCI with the first TTI length may include, when a first sPUCCH format is adopted by the UCI with the first TTI length, transmitting the UCIs with the collision simultaneously using the second sPUCCH format on the predetermined sPUCCH resource corresponding to the second sPUCCH format.

It should be appreciated that, the first sPUCCH format may refer to a sPUCCH format with a maximum payload capacity smaller than a predetermined bit value, i.e., a small-capacity sPUCCH format. The second sPUCCH format may refer to a sPUCCH format with a maximum payload capacity greater than or equal to the predetermined bit value, i.e., a large-capacity sPUCCH format. When the small-capacity sPUCCH format is adopted by the UCI with the first TTI length and the UCI is continued to be transmitted, probably the small-capacity sPUCCH format is incapable of bearing all of UCIs, and at this time, some UCIs may be lost. Hence, it is necessary to adjust the sPUCCH format, and the large-capacity sPUCCH format may be adopted to transmit the UCIs with the collision. It should be further appreciated that, the predetermined sPUCCH resource corresponding to the second sPUCCH format may refer to a resource pre-agreed between the base station and the terminal, or a resource configured by the base station for the terminal in advance.

In a possible embodiment of the present disclosure, when the second sPUCCH format is adopted by the UCI with the first TTI length, transmitting the UCIs with the collision to the base station simultaneously using the second sPUCCH format on the sPUCCH resource corresponding to the second sPUCCH format, wherein the sPUCCH resource corresponds to the UCI with the first TTI length.

It should be appreciated that, when the large-capacity sPUCCH format is adopted by the UCI with the first TTI length and the base station has configured for the terminal the sPUCCH resource corresponding to the second sPUCCH format with respect to the UCI with the first TTI, the terminal may directly transmit the UCIs with the collision on the sPUCCH resource.

It should be further appreciated that, when the base station has configured for the terminal the sPUCCH resource corresponding to the second sPUCCH format with respect to the UCI with the first TTI, the terminal may transmit the UCIs with the collision on the predetermined sPUCCH resource corresponding to the second sPUCCH format rather than the configured sPUCCH resource. The predetermined sPUCCH resource corresponding to the second sPUCCH format may refer to a source pre-agreed between the base station and the terminal, or a resource configured by the base station for the terminal in advance.

In a possible embodiment of the present disclosure, in a first implementation mode, the transmitting the UCIs with the collision to the base station simultaneously using the second sPUCCH format may include concatenating the UCIs with the collision in accordance with a first predetermined rule, and transmitting the concatenated UCIs with the collision to the base station simultaneously using the second sPUCCH format.

To be specific, the first predetermined rule may include ordering the UCIs in accordance with TTI lengths of the UCIs, and ordering the UCIs with a same TTI length in accordance with types of the UCIs.

For example, the UCI with a sTTI length may be ordered before the UCI corresponding a conventional TTI length. When there are different types of UCIs with a same TTI length, the ACK/NACK (if there is the ACK/NACK, i.e., the terminal has received downlink data for which the ACK/NACK needs to be fed back at a current transmission moment) may be ordered before the P-CSI (if there is the P-CSI, i.e., the current transmission moment is a transmission opportunity of the P-CSI), and the P-CSI may be ordered before the SR (if there is the SR, i.e., the current transmission moment is a transmission opportunity of the SR). It should be appreciated that, an order of the UCI with the sTTI length and the UCI with the conventional TTI length may be changed, and an order of the different types of UCIs with the same TTI length may also be changed. For example, a possible order may include the ACK/NACK corresponding to the sTTI length (if exist), the P-CSI corresponding to the sTTI length (if exist), the SR corresponding to the sTTI length (if exist), the ACK/NACK corresponding to the conventional TTI length (if exist), the P-CSI corresponding to the conventional TTI length (if exist), and the SR corresponding to the conventional TTI length (if exist).

To be specific, the first predetermined rule may include ordering the UCIs in accordance with the types of the UCIs, and ordering the UCIs of a same type in accordance with TTI lengths.

For example, for different types of UCIs, the ACK/NACK (if there is the ACK/NACK, i.e., the terminal has received downlink data for which the ACK/NACK needs to be fed back at a current transmission moment) may be ordered before the P-CSI (if there is the P-CSI, i.e., the current transmission moment is a transmission opportunity of the P-CSI), and the P-CSI may be ordered before the SR (if there is the SR, i.e., the current transmission moment is a transmission opportunity of the SR). For the UCIs of a same type, when there is the UCI with different TTI lengths, the UCI with the sTTI length may be ordered before the UCI corresponding the conventional TTI length. For example, a possible order may include the ACK/NACK corresponding to the sTTI length (if exist), the ACK/NACK corresponding to the conventional TTI length (if exist), the P-CSI corresponding to the sTTI length (if exist), the P-CSI corresponding to the conventional TTI length (if exist), the SR corresponding to the sTTI length (if exist), and the SR corresponding to the conventional TTI length (if exist).

It should be further appreciated that, during the implementation, when the UCIs with the collision do not include the UCI of a predetermined type specified in the first predetermined rule, when the first predetermined rule is being implemented, the UCI of the predetermined type specified in the first predetermined rule may be deleted at first.

In other words, during the above ordering, when a certain type of UCI does not exist, this UCI may be deleted. For example, when the current transmission moment is not a transmission opportunity of the P-CSI in accordance with a periodicity configuration of the P-CSI, the P-CSI may not be included when ordering the UCIs with the collision at the current transmission moment. For another example, when the current transmission moment is not a transmission opportunity of the SR in accordance with a periodicity configuration of the SR, the SR may not be included when ordering the UCIs with the collision at the current transmission moment. For yet another example, when the terminal fails to receive any downlink data for which the ACK/NACK needs to be fed back at the current transmission moment, the ACK/NACK may not be included when ordering the UCIs with the collision at the current transmission moment. For still yet another example, for the ACK/NACK, in order to prevent the base station and the terminal from understanding whether the ACK/NACK is included in different ways due to packet loss in the downlink transmission, the ACK/NACK may be assumed to exist all the time.

In a possible embodiment of the present disclosure, the transmitting the UCIs with the collision to the base station simultaneously using the second sPUCCH format may include, when a total quantity of bits of the UCIs with the collision is greater than a transmission capacity of the second sPUCCH format on the sPUCCH resource, compressing the total quantity of bits of the UCIs with the collision in accordance with a second predetermined rule, and transmitting the compressed total quantity of bits of the UCIs with the collision to the base station in the second sPUCCH format. The second predetermined rule may include dropping a part of the UCIs and/or combining a part of the UCIs with the collision.

It should be appreciated that, when the UCIs with the collision are transmitted simultaneously and the total quantity of bits of the UCIs with the collision is greater than the transmission capacity of the second sPUCCH format on the sPUCCH resource, a part of the UCIs in the UCIs with the collision may be dropped in accordance with a predetermined rule and/or a part of the UCIs in the UCIs with the collision may be combined, until the total quantity of bits of the UCIs with the collision meets the transmission capacity. For example, all of or a part of the P-CSI may be preferentially dropped (based on a priority level of CSI, a priority level of a carrier and a priority level of a CSI progress using a method known in the related art, the P-CSI with a high priority level may be selected, and the P-CSI with a low priority level may be preferentially dropped), and/or the UCI with the conventional TTI length may be preferentially dropped (e.g., when there exists the UCI of a same type and corresponding to the sTTI length and the conventional TTI length simultaneously, the UCI with the conventional TTI length may be dropped, or when there exist the UCI with the sTTI length and the UCI with the conventional TTI length simultaneously, the UCI with the conventional TTI may be dropped), and/or the ACK/NACK may be combined (in a time-domain combination manner, frequency-domain combination manner, or space-domain combination manner).

It should be appreciated that, prior to transmitting the UCIs with the collision to the base station simultaneously using the second sPUCCH format, the UCI transmission method may further include: judging whether the terminal supports a simultaneous transmission of the UCIs with the collision in accordance with a configuration in a high-layer signaling or a pre-agreed rule; and when the terminal supports the simultaneous transmission of the UCIs with the collision, transmitting the UCIs with the collision to the base station simultaneously using the second sPUCCH format.

It should be appreciated that, the terminal may transmit the UCIs with the collision to the base station simultaneously only when the terminal supports the simultaneous transmission of the UCIs with the collision as configured by a network. Otherwise, when he terminal does not support the simultaneous transmission of the UCIs with the collision, the UCI of a predetermined type in the UCIs with the collision may be dropped in accordance with a third predetermined rule. For example, all of or a part of the P-CSI and/or all of or a part of the UCIs with the conventional TTI length may be dropped.

The implementation modes of the UCI transmission method will be described hereinafter in more details in conjunction with the actual applications.

At first, it should be appreciated that, for ease of description, in the following, the ACK/NACK corresponding to the sTTI length may be marked as s-ACK/NACK, the P-CSI corresponding to the sTTI length may be marked as s-P-CSI, the SR corresponding to the sTTI length may be marked as s-SR, and ACK/NACK, P-CSI and SR may all correspond to the conventional TTI length.

Implementation mode 1: the terminal may support both the downlink sTTI transmission and the uplink sTTI transmission. The ACK/NACK corresponding to the sTTI length (i.e., s-ACK/NACK) is configured to be transmitted in a small-capacity sPUCCH format A, and the base station has configured for the terminal a channel resource B (which may be one or more resources, e.g., during the TxD, each antenna port may correspond to one resource) corresponding to a large-capacity sPUCCH format B in advance.

First Circumstance

Figure 4:
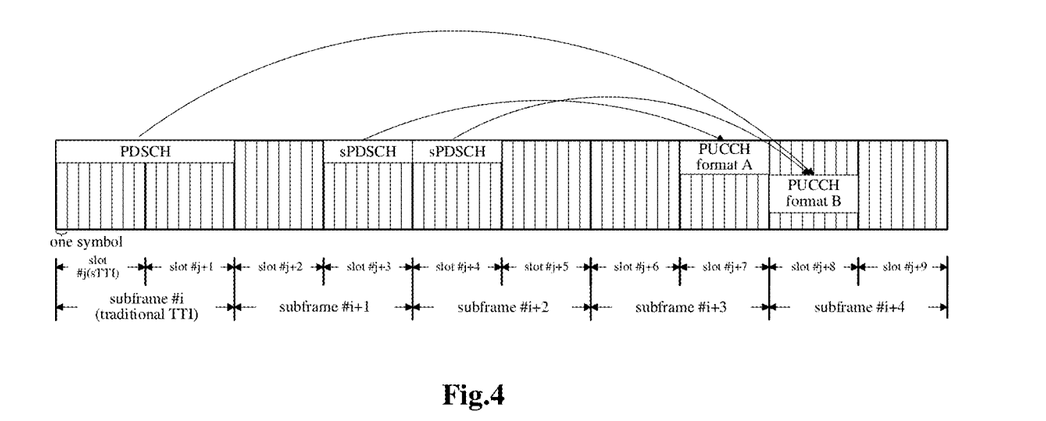
FIG. 4 is a schematic view showing a transmission state of subframes in an implementation mode 1.

At a terminal side, when it is determined that merely the s-ACK/NACK exists in a current sTTI, merely the s-ACK/NACK may be transmitted in the small-capacity sPUCCH format A on a channel resource A (which may be configured by the base station in advance, or acquired in accordance with an indication in a downlink control channel corresponding to the sPUCCH) corresponding to the sPUCCH format A; the s-ACK/NACK may be transmitted within a slot # j+7 of a subframe # i+3 as shown in FIG. 4.

At a base station side, when merely the downlink transmission corresponding to the sTTI length rather than the conventional TTI length has been scheduled for the terminal, merely the s-ACK/NACK may be received in the sPUCCH format A on the channel resource A corresponding to the sPUCCH format A. When the downlink transmission corresponding to the sTTI length and the downlink transmission corresponding to the conventional TTI length has been scheduled for the terminal (it is necessary to feed back the ACK/NACK within a current sTTI for the downlink transmission corresponding to both the sTTI length and the downlink transmission corresponding to the conventional TTI length), the s-ACK/NACK and the ACK/NACK may be received simultaneously using the sPUCCH format B on the channel resource B corresponding to the sPUCCH format B. Upon the receipt of the s-ACK/NACK and the ACK/NACK, the s-ACK/NACK and the ACK/NACK may be acquired in accordance with a predetermined concatenating rule, and then whether to perform retransmission may be determined with respect to the scheduled downlink transmission corresponding to the sTTI length and the conventional TTI length. When the s-ACK/NACK and the ACK/NACK are not received, the base station may determine that there is the packet loss for the terminal, and the retransmission may be performed with respect to all the scheduled downlink transmission. Alternatively, when the s-ACK/NACK and the ACK/NACK are not received, merely the s-ACK/NACK may be received in the sPUCCH format A on the channel resource A corresponding to the sPUCCH format A. At this time, when the s-ACK/NACK has been received, the base station may determine that merely the downlink transmission corresponding to the conventional TTI length has been lost at the terminal, so the retransmission may be performed with respect to the downlink transmission corresponding to the conventional TTI length, and whether the retransmission is to be performed with respect to the downlink transmission corresponding to the sTTI length may be determined in accordance with the s-ACK/NACK. When the s-ACK/NACK has not been received, the base station may determine that all the scheduled downlink transmission has been lost at the terminal, so the retransmission may be performed with respect to all the scheduled downlink transmission.

Second Circumstance

At the terminal side, when the s-ACK/NACK and the ACK/NACK corresponding to downlink transmission of the conventional TTI length exist in the current sTTI simultaneously, the s-ACK/NACK and ACK/NACK may be concatenated to each other in accordance with the predetermined concatenating rule. For example, the s-ACK/NACK may be located before or after the ACK/NACK, or they may be interleaved with each other. The s-ACK/NACK and ACK/NACK may be transmitted simultaneously using the large-capacity sPUCCH format B on the channel resource B corresponding to the sPUCCH format B. For example, the s-ACK/NACK and ACK/NACK may be transmitted within a slot # j+8 of a subframe # i+4 as shown in FIG. 4.

At the base station side, the s-ACK/NACK and ACK/NACK may be received simultaneously using the sPUCCH format B on the channel resource B corresponding to the sPUCCH format B. When the s-ACK/NACK and ACK/NACK have been received, the base station may acquire the s-ACK/NACK and ACK/NACK in accordance with the predetermined concatenating rule, and determine whether the retransmission is to be performed with respect to the scheduled downlink transmission corresponding to the sTTI length and the conventional TTI length. When the s-ACK/NACK and ACK/NACK have not been received yet, the base station may determine that there is packet loss at the terminal, and perform the retransmission with respect to all the scheduled downlink transmission. Alternatively, when the s-ACK/NACK and ACK/NACK have not been received yet, merely the s-ACK/NACK may be received in the sPUCCH format A on the channel resource A corresponding to the sPUCCH format A. When the s-ACK/NACK has been received, the base station may determine that merely the downlink transmission corresponding to the conventional TTI has been lost at the terminal, perform the retransmission with respect to the downlink transmission corresponding to the conventional TTI, and determine whether the retransmission is to be performed with respect to the downlink transmission corresponding to the sTTI length in accordance with the s-ACK/NACK. When the s-ACK/NACK has not been received yet, the base station may determine that all the scheduled downlink transmission has been lost at the terminal, and perform the retransmission with respect to all the scheduled downlink transmission.

Third Circumstance

At the terminal side, regardless of whether the s-ACK/NACK feedback information and the ACK/NACK feedback information exist in the current sTTI simultaneously, it is assumed that they exist simultaneously. The s-ACK/NACK and ACK/NACK may be concatenated to each other in accordance with the predetermined concatenating rule, and transmitted simultaneously using the large-capacity sPUCCH format B on the channel resource B corresponding to the sPUCCH format B. When the s-ACK/NACK and ACK/NACK do not exist, the NACK may be added in accordance with a predefined number of bits for occupation.

At the base station side, the s-ACK/NACK and ACK/NACK may be received simultaneously using the sPUCCH format B on the channel resource B corresponding to the sPUCCH format B. When the s-ACK/NACK and ACK/

NACK have been received, the base station may acquire the s-ACK/NACK and ACK/NACK in accordance with a same concatenating rule, and then determine whether the retransmission is to be performed with respect to the scheduled downlink transmission corresponding to the sTTI length and the conventional TTI length. When the s-ACK/NACK and ACK/NACK have not been received yet, the base station may determine that there is packet loss at the terminal, and then perform the retransmission with respect to all the scheduled downlink transmission.

Implementation mode 2: the terminal may support both the downlink sTTI transmission and the uplink sTTI transmission. The SR corresponding to the sTTI length (i.e., s-SR) is configured to be transmitted in a small-capacity sPUCCH format A, and the base station has configured for the terminal the channel resource B (which may be one or more resources, e.g., during the TxD, each antenna port may correspond to one resource) corresponding to the large-capacity sPUCCH format B in advance.

First Circumstance

Figure 5:
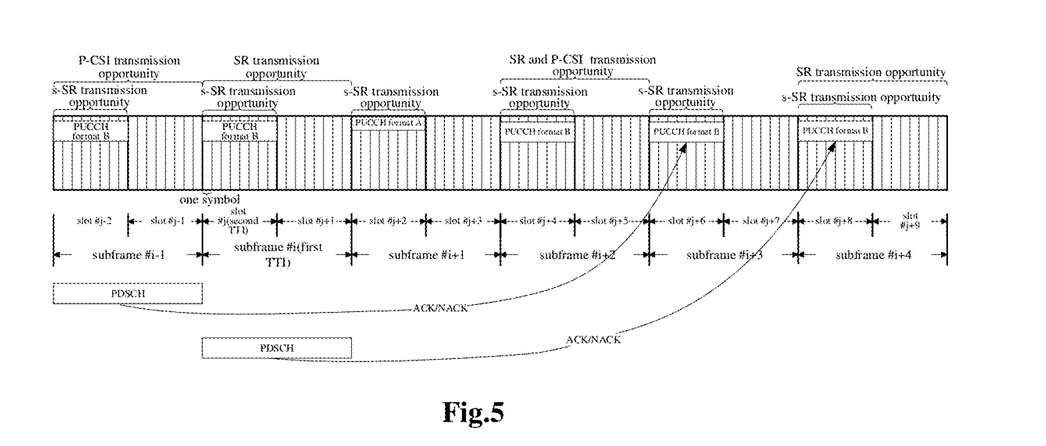
FIG. 5 is a schematic view showing a transmission state of subframes in an implementation mode 2.

At the terminal side, when it is determined that the current sTTI is merely an s-SR transmission opportunity, the terminal may transmit the s-SR merely in the small-capacity sPUCCH format A on the channel resource A (which may be configured by the base station in advance, or acquired in accordance with an indication in a downlink control channel corresponding to the sPUCCH) corresponding to the sPUCCH format A (the s-SR may be transmitted when the s-SR is positive and not transmitted when the s-SR is negative, or the s-SR may be transmitted regardless of positive or not). For example, the s-SR may be transmitted within a slot # j+2 of a subframe # i+1 as shown in FIG. 5.

At the base station side, when judging that the current sTTI is merely the s-SR transmission opportunity, the base station may receive the s-SR in the small-capacity sPUCCH format A merely on the channel resource A corresponding to the sPUCCH format A.

Second Circumstance

At the terminal side, when judging that the current sTTI is both the s-SR transmission opportunity and a transmission opportunity of the SR corresponding to the conventional TTI length, the s-SR and the SR may be concatenated to each other in accordance with the predetermined concatenating rule. For example, the s-SR may be located before, or after, the SR. The terminal may transmit the s-SR and the SR simultaneously using the large-capacity sPUCCH format B on the channel resource B corresponding to the sPUCCH format B. For example, the s-SR and SR may be transmitted within a slot # j of a subframe # i as shown in FIG. 5.

At the base station side, when the current sTTI is both the s-SR transmission opportunity and the SR transmission opportunity corresponding to the conventional TTI, the base station may receive the s-SR and the SR simultaneously using the large-capacity sPUCCH format B on the channel resource corresponding to the sPUCCH format B, and acquire the s-SR and the SR in accordance with the predetermined concatenating rule.

Third Circumstance

At the terminal side, when the current sTTI is both the s-SR transmission opportunity and a transmission opportunity of the P-CSI corresponding to the conventional TTI, the s-SR and the P-CSI may be concatenated to each other in accordance with the predetermined concatenating rule. For example, the s-SR may be located before, or after, the P-CSI. The terminal may transmit the s-SR and the P-CSI simultaneously using the large-capacity sPUCCH format B on the channel resource B corresponding to the sPUCCH format B. For example, the s-SR and P-CSI may be transmitted within a slot # j−2 of a subframe # i−1 as shown in FIG. 5.

At the base station side, when the current sTTI is both the s-SR transmission opportunity and the P-CSI transmission opportunity corresponding to the conventional TTI, the base station may receive the s-SR and the P-CSI simultaneously using the large-capacity sPUCCH format B on the channel resource corresponding to the sPUCCH format B, and acquire the s-SR and the P-CSI in accordance with the predetermined concatenating rule.

Fourth Circumstance

At the terminal side, when judging that the current sTTI is the s-SR transmission opportunity and includes the transmission of the ACK/NACK corresponding to the conventional TTI length, the s-SR and the ACK/NACK may be concatenated to each other in accordance with the predetermined concatenating rule. For example, the s-SR may be located before, or after, the ACK/NACK. The terminal may transmit the s-SR and the ACK/NACK simultaneously using the large-capacity sPUCCH format B on the channel resource B corresponding to the sPUCCH format B. When there is a PDSCH corresponding to the conventional TTI length within a subframe # i−1 and the ACK/NACK feedback information for the PDSCH is transmitted in a sub-frame # i+3 in FIG. 5, the UCI may be transmitted within a slot # j+6 of a subframe # i+3 as shown in FIG. 5.

At the base station side, when the current sTTI is the s-SR transmission opportunity and the base station has scheduled the downlink transmission corresponding to the conventional TTI length within the current sTTI for the ACK/NACK feedback information, the base station may receive the s-SR and the ACK/NACK simultaneously using the large-capacity sPUCCH format B on the channel resource B corresponding to the sPUCCH format B, and acquire the s-SR and the ACK/NACK in accordance with the predetermined concatenating rule.

Fifth Circumstance

At the terminal side, when the current sTTI is both the s-SR transmission opportunity and a transmission opportunity of the SR and the P-CSI corresponding to the conventional TTI, the s-SR, the SR and the P-CSI may be concatenated to each other in accordance with the predetermined concatenating rule. The s-SR, the SR and the P-CSI may be combined in any order, e.g., the s-SR may be located before the SR which is located before the P-CSI, or the P-CSI may be located before the s-SR which is located before the SR, or the P-CSI may be located before the SR which is located before the s-SR. The terminal may transmit the s-SR, the SR and the P-CSI simultaneously using the large-capacity sPUCCH format B on the channel resource B corresponding to the sPUCCH format B. For example, the s-SR, the SR and the P-CSI may be transmitted within a slot # j+4 of a subframe # i+2 as shown in FIG. 5.

At the base station side, when judging that the current sTTI is both the s-SR transmission opportunity and the transmission opportunity of the SR and the P-CSI corresponding to the conventional TTI, the base station may receive the s-SR, the SR and the P-CSI simultaneously using the large-capacity sPUCCH format B on the channel resource B corresponding to the sPUCCH format B, and acquire the s-SR, the SR and the P-CSI in accordance with the predetermined concatenating rule.

Sixth Circumstance

At the terminal side, when judging that the current sTTI is the s-SR transmission opportunity and the P-CSI transmission opportunity corresponding to the conventional TTI, and includes the transmission of the ACK/NACK corresponding to the conventional TTI, the s-SR, the ACK/NACK and the P-CSI may be concatenated to each other in accordance with the predetermined concatenating rule. The s-SR, the ACK/NACK and the P-CSI may be combined in any order, e.g., the s-SR may be located before the ACK/NACK which is located before the P-CSI, or the ACK/NACK may be located before the P-CSI which is located before the s-SR. The terminal may transmit the s-SR, the ACK/NACK and the P-CSI simultaneously using the large-capacity sPUCCH format B on the channel resource B corresponding to the sPUCCH format B. When the transmission opportunity of the SR corresponding to the conventional TTI is exchanged with the transmission opportunity of the P-CSI corresponding to the conventional TTI in FIG. 5, there is a PDSCH corresponding to the conventional TTI within a subframe # i and the ACK/NACK feedback information for the PDSCH is transmitted in a subframe # i+4 in FIG. 5, the UCI may be transmitted within a slot # j+8 of a subframe # i+4 as shown in FIG. 5.

At the base station side, when the current sTTI is both the s-SR transmission opportunity and the transmission opportunity of the P-CSI corresponding to the conventional TTI length, and the base station has scheduled the downlink transmission corresponding to the conventional TTI length for the ACK/NACK feedback information within the current sTTI, the base station may receive the s-SR, the ACK/NACK and the P-CSI simultaneously using the large-capacity sPUCCH format B on the channel resource B corresponding to the sPUCCH format B, and acquire the s-SR, the ACK/NACK and the P-CSI in accordance with the predetermined concatenating rule.

Seventh Circumstance

At the terminal side, when judging that the current sTTI is the s-SR transmission opportunity and the SR transmission opportunity corresponding the conventional TTI and includes the transmission of the ACK/NACK corresponding to the conventional TTI, the s-SR, the ACK/NACK and the SR may be concatenated to each other in accordance with the predetermined concatenating rule. The s-SR, the ACK/NACK and the SR may be combined in any order, e.g., the s-SR may be located before the SR which is located before the P-CSI, or the P-CSI may be located before the SR which is located before the s-SR. The terminal may transmit the s-SR, the SR and the P-CSI simultaneously using the large-capacity sPUCCH format B on the channel resource B corresponding to the sPUCCH format B. When there is a PDSCH corresponding to the conventional TTI length within a subframe # i and the ACK/NACK feedback information for the PDSCH is transmitted in a subframe # i+4 in FIG. 5, the UCI may be transmitted within a slot # j+8 of a subframe # i+4 as shown in FIG. 5.

At the base station side, when the current sTTI is both the s-SR transmission opportunity and the transmission opportunity of the SR corresponding to the conventional TTI, and the base station has scheduled the downlink transmission corresponding to the conventional TTI length for the ACK/NACK feedback information within the current sTTI, the base station may receive the s-SR, the SR, and the P-CSI simultaneously using the large-capacity sPUCCH format B on the channel resource B corresponding to the sPUCCH format B, and acquire the s-SR, the SR, and the P-CSI in accordance with the predetermined concatenating rule.

Eighth Circumstance

At the terminal side, when judging that the current sTTI is the s-SR transmission opportunity and the transmission opportunity of the SR corresponding to the conventional TTI and the P-CSI corresponding to the conventional TTI and includes the transmission of the ACK/NACK corresponding to the conventional TTI, the s-SR, the SR, the P-CSI and the ACK/NACK may be concatenated to each other in accordance with the predetermined concatenating rule. The s-SR, the SR, the P-CSI and the ACK/NACK may be combined in any order, e.g., the s-SR may be located before the SR which is located before the ACK/NACK which is located before the P-CSI, or the ACK/NACK may be located before the P-CSI which is located before the SR which is located before the s-SR. The terminal may transmit the s-SR, the SR, the P-CSI and the ACK/NACK simultaneously using the large-capacity sPUCCH format B on the channel resource B corresponding to the sPUCCH format B. When there is a PDSCH corresponding to the conventional TTI length within a subframe # i−2 and the ACK/NACK feedback information for the PDSCH is transmitted in a subframe # i+2 in FIG. 5, the UCI plus the ACK/NACK feedback information may be transmitted within a slot # j+4 of a subframe # i+2 as shown in FIG. 5.

At the base station side, when judging that the current sTTI is both the s-SR transmission opportunity and the transmission opportunity of the SR corresponding to the conventional TTI and the P-CSI corresponding to the conventional TTI, and the base station has scheduled the downlink transmission corresponding to the conventional TTI length for the ACK/NACK feedback information within the current sTTI, the base station may receive the s-SR, the SR, the P-CSI and the ACK/NACK simultaneously using the large-capacity sPUCCH format B on the channel resource B corresponding to the sPUCCH format B, and acquire the s-SR, the SR, the P-CSI and the ACK/NACK in accordance with the predetermined concatenating rule.

It should be appreciated that, merely parts of the combinations of the UCI with the sTTI and the UCI with the conventional TTI have been listed in the above implementation modes, and the other combinations may be implemented in a similar manner, e.g., the implementation mode 1 and the implementation mode 2 may be combined, which will not be particularly defined herein. In the above implementation modes, it is assumed that all the UCIs with the collision may be borne and transmitted on the preconfigured channel resource B corresponding to the sPUCCH format B. When the total quantity of the bits of the UCIs with the collision exceeds a payload capacity of the channel resource B, some of the UCIs with the collision may be further dropped. For example, some of the UCIs with a low priority level may be dropped in accordance with a predefined priority level of the types of the UCIs (e.g., priority levels of the SR and ACK/NACK are higher than that of the P-CSI), and a priority level of the TTI (e.g., a priority level of the sTTI is higher than that of the conventional TTI).

In addition, during the implementation, when the base station has scheduled the downlink transmission corresponding to the sTTI or the conventional TTI, the packet loss may probably occur at the terminal and the terminal may consider that there is no ACK/NACK feedback information. At this time, the content of the UCI may be understood by the base station and the terminal in different ways. Hence, it may be assumed that the s-ACK/NACK and the ACK/NACK exist in any sTTI within which the ACK/NACK feedback information is capable of being transmitted, and that the s-ACK/NACK and the ACK/NACK always occupy a fixed quantity of bits. When the s-ACK/NACK or the ACK/NACK does not exist, the NACK may be added in accordance with a predefined quantity of bits for occupation, so as to prevent the parsing of the other UCI by the base station from being adversely affected due to the presence or absence of the s-ACK/NACK and/or the ACK/NACK. In addition, during the transmission of the UCI, the terminal may further transmit indication information indicating whether the reported UCI includes the s-ACK/NACK and/or the ACK/NACK and indicating the quantity of bits of the s-ACK/NACK and/or the ACK/NACK. The base station needs to parse the indication information, and determine how to parse the UCI reported by the terminal in accordance with the content included in the indication information.

It should be appreciated that, according to the UCI transmission method in the embodiments of the present disclosure, when the collision is present between different types of UCIs with the sTTI and/or the collision is present between the UCI with the sTTI and the UCI with the conventional TTI, the terminal may transmit the UCIs with the collision simultaneously on an appropriate resource and in an appropriate sPUCCH format in accordance with the capacity of the sPUCCH format corresponding to the UCI. As a result, it is able to prevent the terminal from dropping the UCI excessively while ensuring a transmission time delay for the UCI with the sTTI length, thereby to enable the base station acquire various UCI feedback information.

Figure 6:
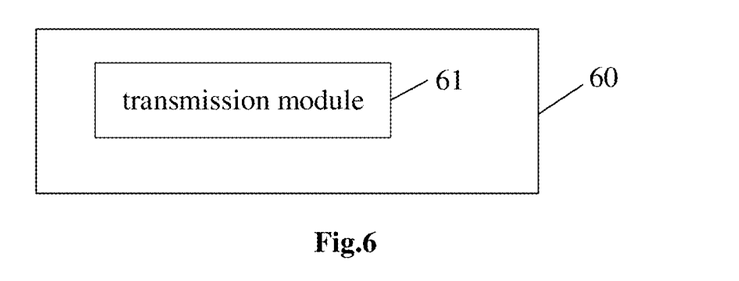
FIG. 6 is a schematic view showing a terminal according to some embodiments of the present disclosure.

The present disclosure further provides in some embodiments a terminal 60 which, as shown in FIG. 6, includes a transmission module 61 configured to, when a collision is present between different types of UCIs with a first TTI length and/or a collision is present between a UCI with the first TTI length and a UCI with a second TTI length, transmit the UCIs with the collision to a base station simultaneously using a second sPUCCH format on a predetermined sPUCCH resource corresponding to the second sPUCCH format, or determine a transmission scheme for the UCIs with the collision in accordance with a sPUCCH format adopted by the UCI with the first TTI length.

In a possible embodiment of the present disclosure, the transmission module 61 is further configured to: when a first sPUCCH format is adopted by the UCI with the first TTI length, transmit the UCIs with the collision simultaneously using the second sPUCCH format on the predetermined sPUCCH resource corresponding to the second sPUCCH format; or when the second sPUCCH format is adopted by the UCI with the first TTI length, transmit the UCIs with the collision to the base station simultaneously using the second sPUCCH format on the sPUCCH resource corresponding to the second sPUCCH format, wherein the sPUCCH resource corresponds to the UCI with the first TTI length.

To be specific, the first sPUCCH format may be a sPUCCH format with a maximum payload capacity smaller than a predetermined bit value, and the second sPUCCH format may be a sPUCCH format with a maximum payload capacity greater than or equal to the predetermined bit value.

To be specific, the UCI may include at least one of ACK/NACK, P-CSI and a SR.

In a possible embodiment of the present disclosure, the transmission module 61 configured to transmit the UCIs with the collision to the base station simultaneously using the second sPUCCH format is further configured to: concatenate the UCIs with the collision in accordance with a first predetermined rule, and transmit the concatenated UCIs with the collision to the base station simultaneously using the second sPUCCH format.

In a possible embodiment of the present disclosure, the first predetermined rule may include ordering the UCIs in accordance with TTI lengths of the UCIs, and ordering the UCIs with a same TTI length in accordance with types of the UCIs.

In a possible embodiment of the present disclosure, the first predetermined rule may include ordering the UCIs in accordance with the types of the UCIs, and ordering the UCIs of a same type in accordance with TTI lengths.

In a possible embodiment of the present disclosure, the transmission module 61 configured to transmit the UCIs with the collision to the base station simultaneously using the second sPUCCH format is further configured to, when a total quantity of bits of the UCIs with the collision is greater than a transmission capacity of the second sPUCCH format on the sPUCCH resource, compress the total quantity of bits of the UCIs with the collision in accordance with a second predetermined rule, and transmit the compressed total quantity of bits of the UCIs with the collision to the base station in the second sPUCCH format. The second predetermined rule may include dropping a part of the UCIs and/or combining a part of the UCIs with the collision.

To be specific, the terminal 60 may further include a first judgment module configured to judge whether a terminal supports a simultaneous transmission of the UCIs with the collision in accordance with a configuration in a high-layer signaling or a pre-agreed rule. The transmission module 61 is further configured to, when the terminal supports the simultaneous transmission of the UCIs with the collision, transmit the UCIs with the collision to the base station simultaneously using the second sPUCCH format.

To be specific, the terminal 60 may further include a processing module configured to, when the terminal does not support the simultaneous transmission of the UCIs with the collision, drop the UCI of a predetermined type in the UCIs with the collision in accordance with a third predetermined rule.

To be specific, the first TTI length may be smaller than the second TTI length.

It should be appreciated that, the implementation of the terminal may refer to that of the UCI transmission method mentioned hereinabove with a same technical effect.

Figure 7:
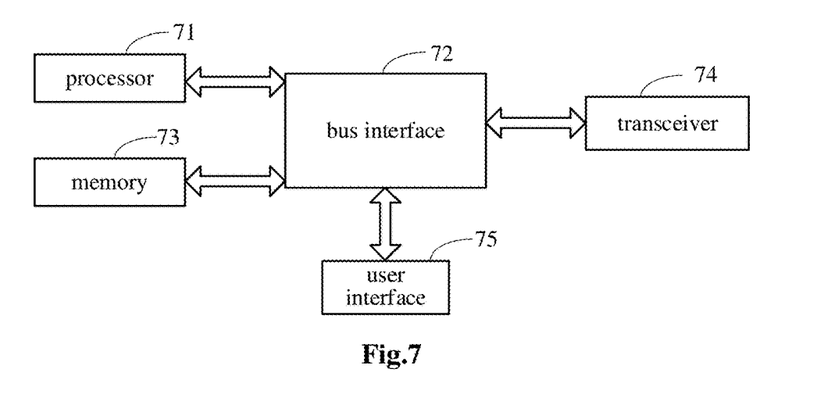
FIG. 7 is another schematic view showing the terminal according to some embodiments of the present disclosure.

The present disclosure further provides in some embodiments a terminal which, as shown in FIG. 7, includes a processor 71, and a memory 73 connected to the processor 71 via a bus interface 72. The memory 73 is configured to store therein programs and data for the operation of the processor 71. The processor 71 is configured to call and execute the programs and data stored in the memory 73, so as to, when a collision is present between different types of UCIs with a first TTI length and/or a collision is present between a UCI with the first TTI length and a UCI with a second TTI length, transmit, through a transceiver 74, the UCIs with the collision to a base station simultaneously using a second sPUCCH format on a predetermined sPUCCH resource corresponding to the second sPUCCH format, or determine a transmission scheme for the UCIs with the collision in accordance with a sPUCCH format adopted by the UCI with the first TTI length.

The transceiver 74 is connected to the bus interface 72, and configured transmit the UCIs with the collision under the control of the processor 71.

It should be appreciated that, in FIG. 7, the bus architecture may include a number of buses and bridges connected to each other, so as to connect various circuits for one or more processors such as the processor 71 and one or more memories such as the memory 73. In addition, the bus architecture may be used to connect various other circuits, such as a circuit for a peripheral device, a circuit for a voltage stabilizer and a power management circuit. The bus interfaces may be provided, and the transceiver 74 may consist of more than one element, e.g., a transmitter and a receiver for communication with any other devices over a transmission medium. With respect to different terminals, a user interface 75 may also be provided for devices which are to be arranged inside or outside the terminal, and these devices may include but not limited to a keypad, a display, a speaker, a microphone and a joystick. The processor 71 may take charge of managing the bus architecture as well general processings. The memory 73 may store data therein for the operation of the processor 71.

It should be appreciated that, all or parts of the above-mentioned steps may be implemented through hardware, or implemented by indicating relevant hardware through a computer program. The computer program may include instructions for executing all or parts of the steps in the above-mentioned method. The computer program may be stored in a computer-readable storage medium in any appropriate form.

Figure 8:
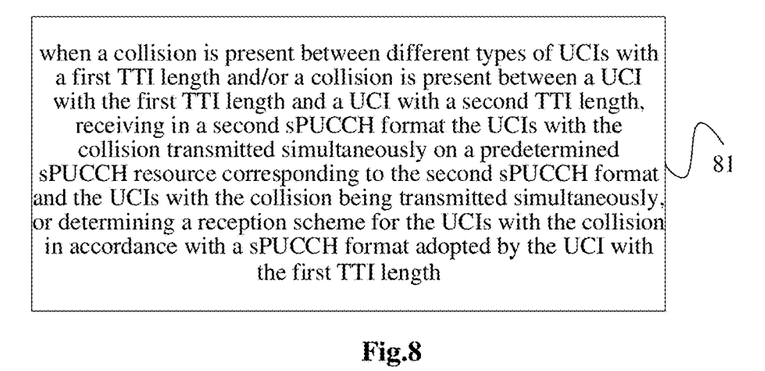
FIG. 8 is a flow chart of a UCI reception method according to some embodiments of the present disclosure.

The present disclosure further provides in some embodiments a UCI reception method which, as shown in FIG. 8, includes Step 81 of, when a collision is present between different types of UCIs with a first TTI length and/or a collision is present between a UCI with the first TTI length and a UCI with a second TTI length, receiving in a second sPUCCH format the UCIs with the collision transmitted simultaneously on a predetermined sPUCCH resource corresponding to the second sPUCCH format and the UCIs with the collision being transmitted simultaneously, or determining a reception scheme for the UCIs with the collision in accordance with a sPUCCH format adopted by the UCI with the first TTI length.

To be specific, the determining the reception scheme for the UCIs with the collision in accordance with the sPUCCH format adopted by the UCI with the first TTI length may include: when a first sPUCCH format is adopted by the UCI with the first TTI length, receiving in the second sPUCCH format the UCIs with the collision transmitted simultaneously on the predetermined sPUCCH resource corresponding to the second sPUCCH format; or when the second sPUCCH format is adopted by the UCI with the first TTI length, receiving in the second sPUCCH format corresponding to the UCI with the first TTI length the UCIs with the collision transmitted simultaneously on the sPUCCH resource corresponding to the second sPUCCH format.

To be specific, the first sPUCCH format may be a sPUCCH format with a maximum payload capacity smaller than a predetermined bit value, and the second sPUCCH format may be a sPUCCH format with a maximum payload capacity greater than or equal to the predetermined bit value.

To be specific, the UCI may include at least one of ACK/NACK, P-CSI and a SR.

In a possible embodiment of the present disclosure, the receiving in the second sPUCCH format the UCIs with the collision transmitted simultaneously may include determining that the UCIs with the collision are concatenated to each other in accordance with a first predetermined rule.

In a possible embodiment of the present disclosure, the first predetermined rule may include ordering the UCIs in accordance with TTI lengths of the UCIs, and ordering the UCIs with a same TTI length in accordance with types of the UCIs.

In a possible embodiment of the present disclosure, the first predetermined rule may include ordering the UCIs in accordance with the types of the UCIs, and ordering the UCIs of a same type in accordance with TTI lengths.

In a possible embodiment of the present disclosure, the receiving in the second sPUCCH format the UCIs with the collision transmitted simultaneously may include determining that the UCIs with the collision transmitted simultaneously are acquired after being compressed in accordance with a second predetermined rule. The second predetermined rule may include dropping a part of the UCIs and/or combining a part of the UCIs with the collision.

In a possible embodiment of the present disclosure, prior to receiving in the second sPUCCH format the UCIs with the collision transmitted simultaneously, the UCI reception method may further include: judging whether a terminal supports a simultaneous transmission of the UCIs with the collision in accordance with a configuration in a high-layer signaling or a pre-agreed rule; and when judging that the terminal supports a simultaneous transmission of the UCIs with the collision, receiving in the second sPUCCH format the UCIs with the collision transmitted simultaneously.

In a possible embodiment of the present disclosure, the UCI reception method may further include, when judging that the terminal does not support the simultaneous transmission of the UCIs with the collision, determining that the UCI of a predetermined type in the UCIs with the collision are to be dropped by the terminal in accordance with a third predetermined rule.

To be specific, the first TTI length may be smaller than the second TTI length.

The above description about the base station with reference to FIGS. 3-5 may be applied to the UCI reception method for use in the base station with a same technical effect.

Figure 9:
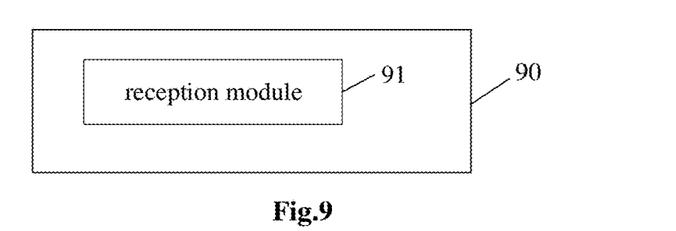
FIG. 9 is a schematic view showing a base station according to some embodiments of the present disclosure.

The present disclosure further provides in some embodiments a base station 90 which, as shown in FIG. 9, includes a reception module 91 configured to, when a collision is present between different types of UCIs with a first TTI length and/or a collision is present between a UCI with the first TTI length and a UCI with a second TTI length, receive in a second sPUCCH format the UCIs with the collision transmitted simultaneously on a predetermined sPUCCH resource corresponding to the second sPUCCH format; or determine a reception scheme for the UCIs with the collision in accordance with a sPUCCH format adopted by the UCI with the first TTI length.

To be specific, the reception module 91 is further configured to: when a first sPUCCH format is adopted by the UCI with the first TTI length, receive in the second sPUCCH format the UCIs with the collision transmitted simultaneously on the predetermined sPUCCH resource corresponding to the second sPUCCH format; or when the second sPUCCH format is adopted by the UCI with the first TTI length, receive in the second sPUCCH format corresponding to the UCI with the first TTI length the UCIs with the collision transmitted simultaneously on the sPUCCH resource corresponding to the second sPUCCH format.

To be specific, the first sPUCCH format may be a sPUCCH format with a maximum payload capacity smaller than a predetermined bit value, and the second sPUCCH format may be a sPUCCH format with a maximum payload capacity greater than or equal to the predetermined bit value.

To be specific, the UCI may include at least one of ACK/NACK, P-CSI and a SR.

In a possible embodiment of the present disclosure, the reception module configured to receive in the second sPUCCH format the UCIs with the collision transmitted simultaneously by the terminal in the second sPUCCH format is further configured to determine that the UCIs with the collision transmitted simultaneously are concatenated to each other in accordance with a first predetermined rule.

To be specific, the first predetermined rule may include ordering the UCIs in accordance with TTI lengths of the UCIs, and ordering the UCIs with a same TTI length in accordance with types of the UCIs.

To be specific, the first predetermined rule may include ordering the UCIs in accordance with the types of the UCIs, and ordering the UCIs of a same type in accordance with TTI lengths.

In a possible embodiment of the present disclosure, the reception module configured to receive in the second sPUCCH format the UCIs with the collision transmitted simultaneously by the terminal in the second sPUCCH format is further configured to determine that the UCIs with the collision transmitted simultaneously are acquired after being compressed in accordance with a second predetermined rule. The second predetermined rule may include dropping a part of the UCIs and/or combining a part of the UCIs with the collision.

In a possible embodiment of the present disclosure, the base station 90 may further include a second determination module configured to judge whether a terminal supports a simultaneous transmission of the UCIs with the collision in accordance with a configuration of high-layer signaling or a pre-agreed rule. The reception module is further configured to, when judging that the terminal supports a simultaneous transmission of the UCIs with the collision, receive in the second sPUCCH format the UCIs with the collision transmitted simultaneously.

In a possible embodiment of the present disclosure, the base station 90 may further include a determination module configured to, when judging that the terminal does not support the simultaneous transmission of the UCIs with the collision, determine that the UCI of a predetermined type in the UCIs with the collision are to be dropped by the terminal in accordance with a third predetermined rule.

To be specific, the first TTI length may be smaller than the second TTI length.

It should be appreciated that, the implementation of the base station may refer to that of the UCI reception method mentioned hereinabove with a same technical effect.

Figure 10:
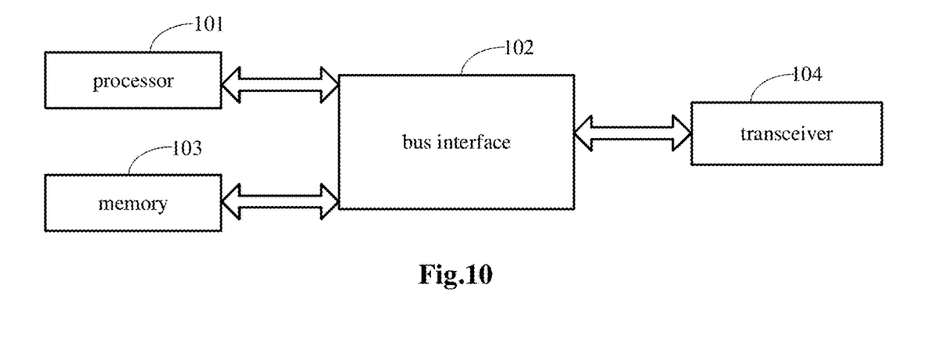
FIG. 10 is a schematic view showing the base station according to some embodiments of the present disclosure.

The present disclosure further provides in some embodiments a base station which, as shown in FIG. 10, includes a processor 101, and a memory 103 connected to the processor 101 via a bus interface 102 and configured to store therein programs and data for the operation of the processor 101. The processor 101 is configured to call and execute the programs and data stored in the memory 103, so as to, when a collision is present between different types of UCIs with a first TTI length and/or a collision is present between a UCI with the first TTI length and a UCI with a second TTI length, receive, through a transceiver 104, the UCIs with the collision simultaneously using a second sPUCCH format on a predetermined sPUCCH resource corresponding to the second sPUCCH format, or determine a reception scheme for the UCIs with the collision in accordance with a sPUCCH format adopted by the UCI with the first TTI length.

It should be appreciated that, the processor 101 is further configured to achieve the function of any other module of the base station mentioned hereinabove.

It should be further appreciated that, the transceiver 104 is connected to the bus interface 102 and configured to receive the UCIs with the collision from the terminal under the control of the processor 101.

In FIG. 10, bus architecture may include a number of buses and bridges connected to each other, so as to connect various circuits for one or more processors such as the processor 101 and one or more memories such as the memory 103. In addition, the bus architecture may be used to connect various other circuits, such as a circuit for a peripheral device, a circuit for a voltage stabilizer and a power management circuit. The bus interface may be provided, and the transceiver 104 may consist of a plurality of elements, i.e., a transmitter and a receiver for communication with any other devices over a transmission medium. The processor 101 may take charge of managing the bus architecture as well as general processings. The memory 103 may store therein data for the operation of the processor 101.

It should be appreciated that, all or parts of the above-mentioned steps may be implemented through hardware, or implemented by indicating relevant hardware through a computer program. The computer program may include instructions for executing all or parts of the steps in the above-mentioned method. The computer program may be stored in a computer-readable storage medium in any appropriate form.

The above embodiments are merely preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An Uplink Control Information (UCI) transmission method, comprising:
   when a collision is present between different types of UCIs with a first Transmission Time Interval (TTI) length and/or a collision is present between a UCI with the first TTI length and a UCI with a second TTI length, transmitting the UCIs with the collision to a base station simultaneously using a second shortened Physical Uplink Control CHannel (sPUCCH) format on a predetermined sPUCCH resource corresponding to the second sPUCCH format, wherein the second sPUCCH format is a sPUCCH format with a maximum payload capacity greater than or equal to a predetermined bit value, and the predetermined sPUCCH resource corresponding to the second sPUCCH format is an additional sPUCCH resource other than a sPUCCH resource adopted by the UCIs with the collision; or
   determining a transmission scheme for the UCIs with the collision in accordance with a sPUCCH format adopted by the UCI with the first TTI length,
   wherein the determining the transmission scheme for the UCIs with the collision in accordance with the sPUCCH format adopted by the UCI with the first TTI length comprises:
      when a first sPUCCH format is adopted by the UCI with the first TTI length, transmitting the UCIs with the collision to the base station simultaneously using a second sPUCCH format on the predetermined sPUCCH resource corresponding to the second sPUCCH format; or
      when the second sPUCCH format is adopted by the UCI with the first TTI length, transmitting the UCIs with the collision to the base station simultaneously using a second sPUCCH format on the sPUCCH resource corresponding to the second sPUCCH format, wherein the sPUCCH resource corresponds to the UCI with the first TTI length,
   wherein the first sPUCCH format is a sPUCCH format with a maximum payload capacity smaller than the predetermined bit value, and the second sPUCCH format is a sPUCCH format with a maximum payload capacity greater than or equal to the predetermined bit value.

2. The UCI transmission method according to claim 1, wherein transmitting the UCIs with the collision to the base station simultaneously using the second sPUCCH format include at least one of following modes:
   mode 1: concatenating the UCIs with the collision in accordance with a first predetermined rule, and transmitting the concatenated UCIs with the collision to the base station simultaneously using the second sPUCCH format;
   mode 2: when a total quantity of bits of the UCIs with the collision is greater than a transmission capacity of the second sPUCCH format on the sPUCCH resource, compressing the total quantity of bits of the UCIs with the collision in accordance with a second predetermined rule, and transmitting the compressed total quantity of bits of the UCIs with the collision to the base station using the second sPUCCH format, wherein the second predetermined rule comprises dropping a part of the UCIs and/or combining a part of the UCIs with the collision;
   mode 3: prior to transmitting the UCIs with the collision to the base station simultaneously using the second sPUCCH format, judging whether a terminal supports a simultaneous transmission of the UCIs with the collision in accordance with a configuration in a high-layer signaling or a pre-agreed rule; when the terminal supports the simultaneous transmission of the UCIs with the collision, transmitting the UCIs with the collision to the base station simultaneously using the second sPUCCH format; when the terminal does not support the simultaneous transmission of the UCIs with the collision, dropping the UCI of a predetermined type in the UCIs with the collision in accordance with a third predetermined rule.

3. The UCI transmission method according to claim 2, wherein when determining the transmission scheme for the UCIs with the collision in accordance with a sPUCCH format adopted by the UCI with the first TTI length, the transmitting the UCIs with the collision to the base station simultaneously using the second sPUCCH format comprises at least one of following modes:
   mode 1: concatenating the UCIs with the collision in accordance with a first predetermined rule, and transmitting the concatenated UCIs with the collision to the base station simultaneously using the second sPUCCH format;
   mode 2: when a total quantity of bits of the UCIs with the collision is greater than a transmission capacity of the second sPUCCH format on the sPUCCH resource, compressing the total quantity of bits of the UCIs with the collision in accordance with a second predetermined rule, and transmitting the compressed total quantity of bits of the UCIs with the collision to the base station using the second sPUCCH format, wherein the second predetermined rule comprises dropping a part of the UCIs and/or combining a part of the UCIs with the collision;
   mode 3: prior to transmitting the UCIs with the collision to the base station simultaneously using the second sPUCCH format, judging whether a terminal supports a simultaneous transmission of the UCIs with the collision in accordance with a configuration in a high-layer signaling or a pre-agreed rule; when the terminal supports the simultaneous transmission of the UCIs with the collision, transmitting the UCIs with the collision to the base station simultaneously using the second sPUCCH format; when the terminal does not support the simultaneous transmission of the UCIs with the collision, dropping the UCI of a predetermined type in the UCIs with the collision in accordance with a third predetermined rule.

4. The UCI transmission method according to claim 3, wherein the first predetermined rule comprises:
   ordering the UCIs in accordance with TTI lengths of the UCIs, and ordering the UCIs with a same TTI length in accordance with types of the UCIs; or
   ordering the UCIs in accordance with the types of the UCIs, and ordering the UCIs of a same type in accordance with TTI lengths.

5. The UCI transmission method according to claim 1, wherein the first TTI length is smaller than the second TTI length.

6. A UCI reception method, comprising:
   when a collision is present between different types of UCIs with a first TTI length and/or a collision is present between a UCI with the first TTI length and a UCI with a second TTI length,
   receiving in a second sPUCCH format the UCIs with the collision transmitted simultaneously on a predetermined sPUCCH resource corresponding to the second sPUCCH format, wherein the second sPUCCH format is a sPUCCH format with a maximum payload capacity greater than or equal to a predetermined bit value, and the predetermined sPUCCH resource corresponding to the second sPUCCH format is an additional sPUCCH resource other than a sPUCCH resource adopted by the UCIs with the collision; or
   determining a reception scheme for the UCIs with the collision in accordance with a sPUCCH format adopted by the UCI with the first TTI length,
   wherein the determining the reception scheme for the UCIs with the collision in accordance with the sPUCCH format adopted by the UCI with the first TTI length comprises:
   when a first sPUCCH format is adopted by the UCI with the first TTI length, receiving in the second sPUCCH format the UCIs with the collision transmitted simultaneously on the predetermined sPUCCH resource corresponding to the second sPUCCH format; or
   when the second sPUCCH format is adopted by the UCI with the first TTI length, receiving in the second sPUCCH format corresponding to the UCI with the first TTI length the UCIs with the collision transmitted simultaneously on the sPUCCH resource corresponding to the second sPUCCH format,
   wherein the first sPUCCH format is a sPUCCH format with a maximum payload capacity smaller than the predetermined bit value, and the second sPUCCH format is a sPUCCH format with a maximum payload capacity greater than or equal to the predetermined bit value.

7. The UCI reception method according to claim 6, wherein the receiving in the second sPUCCH format the UCIs with the collision transmitted simultaneously comprises at least one of following modes:
   mode 1: determining that the UCIs with the collision are concatenated to each other in accordance with a first predetermined rule;

mode 2: determining that the UCIs with the collision transmitted simultaneously are acquired after being compressed in accordance with a second predetermined rule, wherein the second predetermined rule comprises dropping a part of the UCIs and/or combining a part of the UCIs with the collision;

mode 3: prior to receiving in the second sPUCCH format the UCIs with the collision transmitted simultaneously, judging whether a terminal supports a simultaneous transmission of the UCIs with the collision in accordance with a configuration in a high-layer signaling or a pre-agreed rule; when judging that the terminal supports a simultaneous transmission of the UCIs with the collision, receiving in the second sPUCCH format the UCIs with the collision transmitted simultaneously; when judging that the terminal does not support the simultaneous transmission of the UCIs with the collision, determining that UCIs with the collision are to be dropped by the terminal in accordance with a third predetermined rule.

8. The UCI reception method according to claim 7, wherein when determining the reception scheme for the UCIs with the collision in accordance with a sPUCCH format adopted by the UCI with the first TTI length, the receiving in the second sPUCCH format the UCIs with the collision transmitted simultaneously comprises:

mode 1: determining that the UCIs with the collision are concatenated to each other in accordance with a first predetermined rule;

mode 2: determining that the UCIs with the collision transmitted simultaneously are acquired after being compressed in accordance with a second predetermined rule, wherein the second predetermined rule comprises dropping a part of the UCIs and/or combining a part of the UCIs with the collision;

mode 3: prior to receiving in the second sPUCCH format the UCIs with the collision transmitted simultaneously, judging whether a terminal supports a simultaneous transmission of the UCIs with the collision in accordance with a configuration in a high-layer signaling or a pre-agreed rule; when judging that the terminal supports a simultaneous transmission of the UCIs with the collision, receiving in the second sPUCCH format the UCIs with the collision transmitted simultaneously; when judging that the terminal does not support the simultaneous transmission of the UCIs with the collision, determining that UCIs with the collision are to be dropped by the terminal in accordance with a third predetermined rule.

9. The UCI reception method according to claim 8, wherein the first predetermined rule comprises:

ordering the UCIs in accordance with TTI lengths of the UCIs, and ordering the UCIs with a same TTI length in accordance with types of the UCIs; or ordering the UCIs in accordance with the types of the UCIs, and ordering the UCIs of a same type in accordance with TTI lengths.

10. The UCI reception method according to claim 6, wherein the first TTI length is smaller than the second TTI length.

11. A base station, comprising a processor, a memory and a transceiver, wherein the processor is configured to read a program stored in the memory to implement the UCI reception method according to claim 6, wherein the transceiver is configured to receive and transmit data, and the memory is configured to store therein data for an operation of the processor.

12. The base station according to claim 11, wherein the processor is further configured to read the program stored in the memory to implement at least one of following modes:

mode 1: determining that the UCIs with the collision are concatenated to each other in accordance with a first predetermined rule;

mode 2: determining that the UCIs with the collision transmitted simultaneously are acquired after being compressed in accordance with a second predetermined rule, wherein the second predetermined rule comprises dropping a part of the UCIs and/or combining a part of the UCIs with the collision;

mode 3: prior to receiving in the second sPUCCH format the UCIs with the collision transmitted simultaneously, judging whether a terminal supports a simultaneous transmission of the UCIs with the collision in accordance with a configuration in a high-layer signaling or a pre-agreed rule; when judging that the terminal supports a simultaneous transmission of the UCIs with the collision, receiving in the second sPUCCH format the UCIs with the collision transmitted simultaneously; when judging that the terminal does not support the simultaneous transmission of the UCIs with the collision, determining that UCIs with the collision are to be dropped by the terminal in accordance with a third predetermined rule.

13. The base station according to claim 11, wherein the first predetermined rule comprises:

ordering the UCIs in accordance with TTI lengths of the UCIs, and ordering the UCIs with a same TTI length in accordance with types of the UCIs; or ordering the UCIs in accordance with the types of the UCIs, and ordering the UCIs of a same type in accordance with TTI lengths.

14. The base station according to claim 11, wherein the first TTI length is smaller than the second TTI length.

15. A terminal, comprising a processor, a memory and a transceiver, wherein the processor is configured to read a program stored in the memory to, when a collision is present between different types of UCIs with a first TTI length and/or a collision is present between a UCI with the first TTI length and a UCI with a second TTI length, transmit through the transceiver the UCIs with the collision to a base station simultaneously using a second sPUCCH format on a predetermined sPUCCH resource corresponding to the second sPUCCH format, wherein the second sPUCCH format is a sPUCCH format with a maximum payload capacity greater than or equal to a predetermined bit value, and the predetermined sPUCCH resource corresponding to the second sPUCCH format is an additional sPUCCH resource other than a sPUCCH resource adopted by the UCIs with the collision; or determine a transmission scheme for the UCIs with the collision in accordance with a sPUCCH format adopted by the UCI with the first TTI length wherein the processor is further configured to read the program stored in the memory to: when a first sPUCCH format is adopted by the UCI with the first TTI length, transmit through the transceiver the UCIs with the collision to the base station simultaneously using a second sPUCCH format on the predetermined sPUCCH resource corresponding to the second sPUCCH format; or when the second sPUCCH format is adopted by the UCI with the first TTI length, transmit through the transceiver the UCIs with the collision to the base station simultaneously using a second sPUCCH format on the sPUCCH resource corresponding to the second sPUCCH format, wherein the sPUCCH resource corresponds to the UCI with the first TTI length, wherein the first sPUCCH format is a sPUCCH format with a maximum payload capacity smaller than the predetermined bit value, and the second sPUCCH format is a sPUCCH format with a maximum payload capacity greater than or equal to the predetermined bit value, wherein the transceiver is configured to receive and transmit data, and the memory is configured to store therein data for an operation of the processor.

16. The terminal according to claim 15, wherein the processor is further configured to read the program stored in the memory to implement at least one of following modes:

mode 1: concatenating the UCIs with the collision in accordance with a first predetermined rule, and transmitting the concatenated UCIs with the collision to the base station simultaneously using the second sPUCCH format;

mode 2: when a total quantity of bits of the UCIs with the collision is greater than a transmission capacity of the second sPUCCH format on the sPUCCH resource, compressing the total quantity of bits of the UCIs with the collision in accordance with a second predetermined rule, and transmitting the compressed total quantity of bits of the UCIs with the collision to the base station using the second sPUCCH format, wherein the second predetermined rule comprises dropping a part of the UCIs and/or combining a part of the UCIs with the collision;

mode 3: prior to transmitting the UCIs with the collision to the base station simultaneously using the second sPUCCH format, judging whether a terminal supports a simultaneous transmission of the UCIs with the collision in accordance with a configuration in a high-layer signaling or a pre-agreed rule; when the terminal supports the simultaneous transmission of the UCIs with the collision, transmitting the UCIs with the collision to the base station simultaneously using the second sPUCCH format; when the terminal does not support the simultaneous transmission of the UCIs with the collision, dropping the UCI of a predetermined type in the UCIs with the collision in accordance with a third predetermined rule.

17. The terminal according to claim 16, wherein the first predetermined rule comprises:

ordering the UCIs in accordance with TTI lengths of the UCIs, and ordering the UCIs with a same TTI length in accordance with types of the UCIs; or ordering the UCIs in accordance with the types of the UCIs, and ordering the UCIs of a same type in accordance with TTI lengths.

18. The terminal according to claim 15, wherein the first TTI length is smaller than the second TTI length.

* * * * *